United States Patent
Haddock

(10) Patent No.: US 6,187,197 B1
(45) Date of Patent: Feb. 13, 2001

(54) MULTI-STAGE ENGINE COOLANT RECYCLING PROCESS

(76) Inventor: Marvin Haddock, 10509 Rawhide Trail, Austin, TX (US) 78736

( * ) Notice: Under 35 U.S.C. 154(b), the term of this patent shall be extended for 0 days.

(21) Appl. No.: 09/182,393

(22) Filed: Oct. 28, 1998

(51) Int. Cl.[7] .............................. B01D 61/42; B01D 61/02
(52) U.S. Cl. ........................ 210/641; 210/652; 204/542; 204/544; 568/868
(58) Field of Search ................................ 210/641, 652, 210/703, 787, 806, 900, 258, 259; 204/542, 544; 568/868

(56) References Cited

U.S. PATENT DOCUMENTS

| | | |
|---|---|---|
| 3,931,342 | 1/1976 | Sheng . |
| 4,080,247 | 3/1978 | Malakul . |
| 4,427,507 * | 1/1984 | van Aken et al. ................... 204/522 |
| 4,808,287 * | 2/1989 | Hark ..................................... 210/637 |
| 4,946,595 | 8/1990 | Miller, Jr. . |
| 4,996,874 | 3/1991 | Colomer et al. . |
| 5,037,558 * | 8/1991 | Kalnins ................................ 210/702 |
| 5,167,826 | 12/1992 | Eaton . |
| 5,194,159 * | 3/1993 | George et al. . |
| 5,558,775 * | 9/1996 | Busch, Jr. ............................. 210/638 |
| 5,817,889 * | 10/1998 | Pondebat et al. ..................... 568/679 |

OTHER PUBLICATIONS

Baryon Environmental brochure entitled: "Clarifies Wastewater,".

Eaton et al., "Modern Reverse Osmosis Recycling of Used Engine Coolant," SAE Technical Paper Series 971773, 1997.

Eaton, "Engine Reliability Experience of Mixed Vehicle Fleets Operating on Engine Coolant Recycled with Reverse Osmosis Technology," SAE Technical paper Series 962239, 1996.

Flow Schematic (Continuous) Baryon Model No. RCLM–05/AD (1–6 GPM Capacity).

Haddock and Eaton, "Recycling used engine coolant using high–volume stationary, multiple technology equipment," American Society for Testing and Materials, West Conshohocken, Pennsylvania, pp. 1–14, 1999.

Huff, "Using Reverse Osmosis to Recycle Engine Coolant," SAE Technical Paper Series 921635, 1992.

Product Bulletin, Conoco.

(List continued on next page.)

Primary Examiner—W. L. Walker
Assistant Examiner—Richard W. Ward
(74) Attorney, Agent, or Firm—Fulbright & Jaworski

(57) ABSTRACT

A multi-stage apparatus and a process for recycling used engine coolant employs a combination of filtration, dissolved air floatation, centrifugation (hydrocyclone separation), semi-permeable nano filtration, reverse osmosis, and continuous deionization for separating ethylene glycol, with or without propylene glycol, and water from used engine coolant. The engine coolant is pre-filtered through a series of filters. The filters remove particulate contaminates. This filtered fluid is then subjected to dissolved air floatation and/or centrifugation to remove organic petroleum contaminants. Then, it is pressurized prior to being passed through semi-permeable nano filtration. The nano filtration separates the feed stream into a ultra filtration solution and a concentrated waste solution. The concentrate solution is returned to a centrifuged coolant tank for continuous circulation through the nano filtration device. The ultra filtration solution is pressurized and passed through a reverse osmosis device, which separates the feed stream into a permeate solution and a concentrated waste solution. The concentrated waste solution is returned to a ultrafiltrate solution tank for continuous circulation through the reverse osmosis device. The permeate solution is subjected to final refining by continuous deionization which reduces ionic contaminants. Depending upon environmental conditions, a heater and/or heat exchanger maintain the temperature of the process solution within an optimum pre-established operating temperature range.

17 Claims, 5 Drawing Sheets

OTHER PUBLICATIONS

VORTOIL® Separation Systems brouchure entitled: "deoiling," Advancing Separation Solutions™.

VORTOIL® Separation Systems Operations & Maintenance manual Vortoil L–Liner Separator, Document No. 6803, Rev. 2, Aug. 1995.

VORTOIL® Separation Systems.

Haddock and Eaton, "Recycling used engine coolant using high–volume stationary, multiple technology equipment," *Engine Coolant Testing, Fourth Volume, ASTM STP 1335*, R. E. Beal, Ed., American Society for Testing and Materials, pp. 251–260, 1999.

\* cited by examiner

| Property | ASTM/TMC Specification | Virgin Pre-Diluted Coolant Data | Recycled Pre-Diluted Coolant Data |
|---|---|---|---|
| Color | Distinctive | Green | Green |
| Effect on non-metals | No adverse effect | No adverse effect | No adverse effect |
| Specific Gravity @ 15.5 C | 1.110 to 1.145 EG<br>1.030 to 1.065 PG | 1.040 | 1.040 |
| Freeze Point C | 50 vol. % in water:<br>-37 max. EG,<br>-32.2 max. PG | -37 | -37 |
| Boiling Point $^A$.(C) | 163 min. EG<br>151.7 min. PG | 152 | 152 |
| Effect on Auto-motive Finish | No Effect | No Effect | No Effect |
| Ash content, mass % | 5.00% max. | 0.5% | 0.5% |
| pH: 50 vol% in distilled water: | 7.5 to 11.0 | 10.4 | 10.4 |
| Chloride, PPM | 25.0 max. | 21 | 10 |
| Water, mass % | 5 max. | 50 | 50 |
| Reverse Alkalinity, ml | Report | 7.0 | 7.5 |
| Corrosion in Glassware D1384 | | | |
| Copper | 10 max. | 1 | 1 |
| Solder | 30 max. | 8 | 7 |
| Brass | 10 max. | 1 | 0 |

*FIG. 5A*

| | | | |
|---|---|---|---|
| Steel | | 10 max. | 0 |
| Cast iron | | 10 max. | 0 |
| Aluminum | | 30 max. | 0 |
| Simulated Service | D2570 | | |
| Copper | | 20 max. | 3 | 1 |
| Solder | | 60 max. | 15 | 10 |
| Brass | | 20 max. | 3 | 0 |
| Steel | | 20 max. | 1 | 1 |
| Cast iron | | 20 max. | 1 | 1 |
| Aluminum | | 60 max. | 3 | 2 |
| Corrosion of Cast | D4340[A] | 1.00 max. | 0.06 | 0.1 |
| Aluminum | | | | |
| Foaming | | | | |
| Volume, ml | D1881 | 150 max. /5 max. | 45 ml | 50 ml |
| Break time, seconds | | | 2.7 sec. | 3.0 sec. |

*FIG. 5B*

MULTI-STAGE ENGINE COOLANT RECYCLING PROCESS

BACKGROUND OF THE INVENTION

1. Field of the Invention

The present invention relates to an apparatus and an improved process for recycling used glycol-based engine coolant.

2. Description of Related Art

Engine coolants are used to protect internal combustion engines from temperature extremes. The coolants employ ethylene glycol with or without propylene glycol to lower the freezing point and raise the boiling point of water in internal combustion engines. These coolants also commonly employ corrosion inhibitors to counteract the corrosion associated with engine coolants. The coolants typically contain ethylene glycol, with or without propylene glycol, at a concentration of about 30 to 70% by volume, and corrosion inhibitors at approximately 1 to 3% by weight.

The American Society of Testing Materials (ASTM) sets recognized industry standards for the components of engine coolants, both virgin and recycled. The Maintenance Council (TMC) of the American Trucking Association also sets recognized standards for engine coolants.

The useful life of engine coolants is limited by the degradation over time of the glycol and inhibitor components. The glycol components (ethylene glycol with or without propylene glycol) chemically break down into various undesirable organic acids. The accumulation of these acids lowers the pH of the engine coolant composition from an initial pH of approximately 10. When the pH decreases below approximately 8.3, aluminum, steel and iron corrode, weakening the components that they comprise and resulting in eventual component functional failure. In heavy-duty applications, the necessary and commonly practiced addition of supplemental coolant additives (SCAs) increases the total dissolved solids (TDS) in the coolant until a saturation threshold is approached, at which point severe engine damage is probable. Coolant with excessive TDS is associated with premature failure of radiators, water pumps and other cooling system components. Copper and brass also corrode upon extended exposure to engine coolant. In addition, the lead solder in radiators can degrade into lead oxide, eventually allowing leaks to develop in the coolant system heat exchangers.

Because of the well-established corrosive effects of the circulating coolant, initial corrosion inhibitors and SCAs are conventionally added directly to the engine coolant. However, with time the inhibitors are consumed, allowing the corrosive effects of the engine coolant to damage the entire cooling system. Implementation of certain maintenance procedures is necessary to prevent such damage. The most common procedure is removal and replacement of the engine coolant after a pre-established time or service interval. In some instances cooling system additives, which are usually alkaline and include SCAs, are directly added to the coolant to extend the protective properties, decrease the corrosive effects, and postpone replacement of the coolant.

Recycling used engine coolant has become increasingly desirable due to two significant factors. First, engine coolant frequently merits designation as a hazardous waste under the Federal Clean Water Act. Federal and some state environmental protection agencies have instituted strict regulation of the disposal of used engine coolant. In some cases the disposal of engine coolant requires imposition of waste disposal fees and surcharges. Second, ethylene glycol, the principal cost component of engine coolant, has become more expensive. Dramatic price fluctuations and significant shortages in the supply of ethylene glycol have occurred. Therefore, there are both environmental and economic pressures to recycle engine coolant and recover the glycol component in an efficient and cost-effective manner.

A number of processes and systems have been advanced as possible commercially viable solutions to the problem of recycling engine coolant. Most of the processes have employed filtration, ion exchange or distillation techniques in various forms. Distillation of used engine coolant alone sometimes produces an acceptable end product; however, it is an expensive, energy consumptive, and relatively slow process which is not suitable for many potential users. Furthermore, distillation equipment is capital intensive and is associated with various workplace hazards. Relatively simple chemical and filtering techniques have been employed apart from and in conjunction with distillation for recovering and recycling used engine coolant. Engine manufacturers have required more thorough purification of the fluid than can be accomplished through simple or chemical filtration methods. This requirement has been underlined in light of advancements in antifreeze chemical inhibitor technologies, and requirements that all pre-existing inhibitor chemistries be removed from the used engine coolant have been imposed.

An early system for recycling engine coolant used "chemically assisted filtration." The concept of this system was that aeration and pH adjustment of coolant would precipitate contaminants, and the addition of chemical additives would restore adequate functionality to permit extended use of the coolant. U.S. Pat. No. 4,946,595 discloses a process for physically and chemically treating used engine coolant of a type which contains one or more glycol and/or alcohol based antifreeze components. The disclosed process includes the steps of oxidation with one or more known oxidizing agents, precipitation with one or more known salt forming agents, and filtration. Chemical additives are added to enhance the oxidation and precipitation. Various corrosion inhibitors and buffering agents are also added to adjust the pH of the recovered solution. However, the appearance of coolant recycled by chemically assisted filtration was commercially unacceptable in many cases. There were also concerns that filtration alone did not provide adequate purification of the recycled coolant.

Another method available for recycling engine coolant is the reverse osmosis (R/O) process, which provides an intermediate fluid that is pure and offers a production rate that is fairly cost-effective compared to distillation (Huff 1992 SAE 921635). The osmosis phenomenon is observed in nature as a distribution or equalization behavior of naturally occurring chemicals. The R/O process for recycling engine coolant has been described in detail in the literature (Eaton et al., 1997 SAE 971773). U.S. Pat. No. 5,167,826 discloses an apparatus and a process for purification of engine coolant by reverse osmosis, and a process for reinhibition with anti-corrosion inhibitors and buffering agents common to antifreeze manufacturing. Reverse osmosis is a faster and more economical method of coolant recycling than distillation, and provides far better purification than filtration.

There are, however, shortcomings to the R/O process for recycling used engine coolant described in U.S. Pat. No. 5,167,826. In particular, when oil or similar petroleum products enter the RIO system, they coat the membranes, "blinding" them, and reducing production of recycled coolant to a trickle. In addition, recycling engine coolant by the R/O system alone does not decrease conventional inhibitor anions in the coolant to a level that would permit reinhibition of the intermediate fluid either with traditional, inorganic technologies, or European style carboxylate inhibitors.

Thus, there has been a need for a way to provide a highly purified recycled engine coolant at a cost advantageous compared to virgin coolant.

SUMMARY OF THE INVENTION

Briefly stated, the invention in a preferred form is an apparatus and a process which is employed for recycling the glycol and water components of used engine coolant. The used engine coolant is treated through a sequence of purification processes to result in a final recovered, pure fluid that consists of water, ethylene glycol with or without propylene glycol, and less than 0.001 weight percent contaminants.

The used engine coolant is filtered to remove various particulate substances, using one or more filters in series along a flow path. If more than one filter is used, the filters may be of decreasing pore size along the flow path. The filtered coolant is then introduced into a dissolved air floatation separator, a hydrocyclone separator, or a filter press to remove petroleum contaminants (oils and fuels) and particulates from the filtered coolant. The dissolved air floatation separator and hydrocyclone separator may be used together in series. The removal of petroleum contaminants and particulates is extremely important for trouble-free operation for the membrane separation steps (semi-permeable nano filtration and reverse osmosis). The fluid, now purified of oils, grease, fuels, and larger particulates is collected in a holding tank where it is pressurized to a pressure in the range of 50 to 1200 psi, more particularly 100 to 800 psi, or even more particularly 350 to 600 psi and then passed through a semi-permeable nano filtration device whereby glycol and water are separated from the remaining fluid by a semi-permeable nano filtration process. The nano filtered filtrate is collected in a permeate holding tank. The concentrate material separated from the filtrate is returned to previous holding tank for additional passage through the semi-permeable nano filtration device. The filtrate in the permeate holding tank is repressurized to a pressure in the range of 50 to 1200 psi, more particularly 50 to 800 psi, or even more particularly 50 to 300 psi, and passed through a semi-permeable reverse osmosis device, whereby glycols and water are further purified. Concentrate separated from the purified glycols and water is passed back to the permeate holding tank for additional passage through the reverse osmosis process. The permeate is now clear in appearance, but contains anionic contaminants from tap water (for example, chlorides) and from the old inhibitors (for example, nitrite and borate). The recovered glycol and water (permeate) are transported to the continuous electrolysis deionization unit (CDI). The CDI reduces the concentration of undesirable anions in the permeate. Trace contaminants remaining may be removed by distillation, or purification through a dual-bed deionization device, resulting in a solution of 99.999% pure water/glycol coolant base fluid. The recycled coolant is purified sufficiently to meet ASTM coolant standards when properly reinhibited.

An object of the invention is to provide a new and improved apparatus and process for commercial recycling of used engine coolant.

Another object of the invention is to provide a new and improved apparatus and process wherein used engine coolant may be recycled in a relatively inexpensive and efficient manner.

A further object of the invention is to provide a new and improved apparatus and process for recovering used engine coolant which, upon addition of suitable additives, results in a recycled coolant composition having effective corrosion inhibitor properties, effective freeze and boil protection properties, a pH between approximately 8.0 and 10.5, and additional properties which satisfy standard specifications for new and recycled engine coolant.

A further object of the invention is to advance the purification technology of the apparatus and process to permit the transformation of coolant inhibited with "conventional" (inorganic) inhibitor technologies to coolant that may be inhibited either conventionally or with carboxylate technologies often referred to as "extended service" or "long life" inhibitor systems.

A yet further object of the invention is to provide a new and improved apparatus and process for recycling engine coolant which apparatus and process are capable of separating a much higher volume of pure glycol and water from the used engine coolant and does not require distillation or other energy consumptive processes.

Other objects and advantages of the invention will be apparent from the drawings and the specification.

BRIEF DESCRIPTION OF THE DRAWINGS

The following drawings form part of the present specification and are included to further demonstrate certain aspects of the present invention. The invention may be better understood by reference to these drawings in combination with the detailed description of specific embodiments presented herein.

FIG. 5 is a chart providing ASTM!1MC Standards and comparing the properties of virgin coolant and coolant recycled in accordance with the present invention.

DESCRIPTION OF ILLUSTRATIVE EMBODIMENTS

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Flow Diagram for Recycling Engine Coolant

Figure 1:
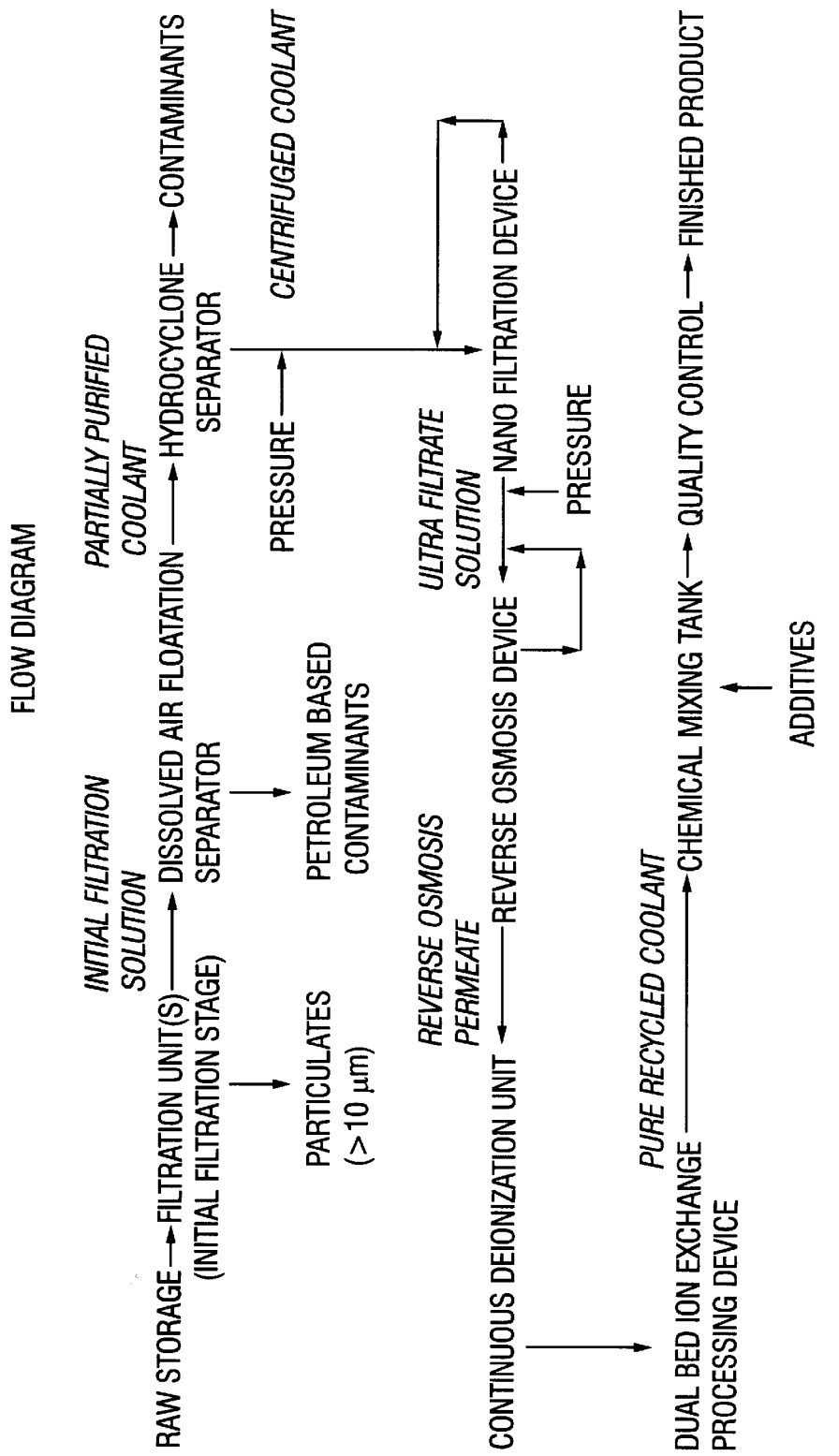
FIG. 1 is a flow diagram of an apparatus for recycling engine coolant in accordance with the present invention.
Figure 2:
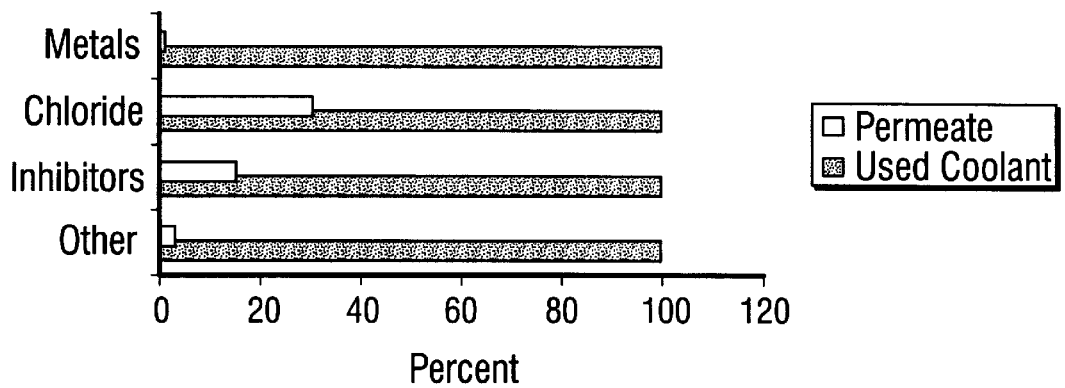
FIG. 2 is a chart showing the percentage of contaminants remaining in the coolant after permeating through the reverse osmosis membrane.
Figure 3:
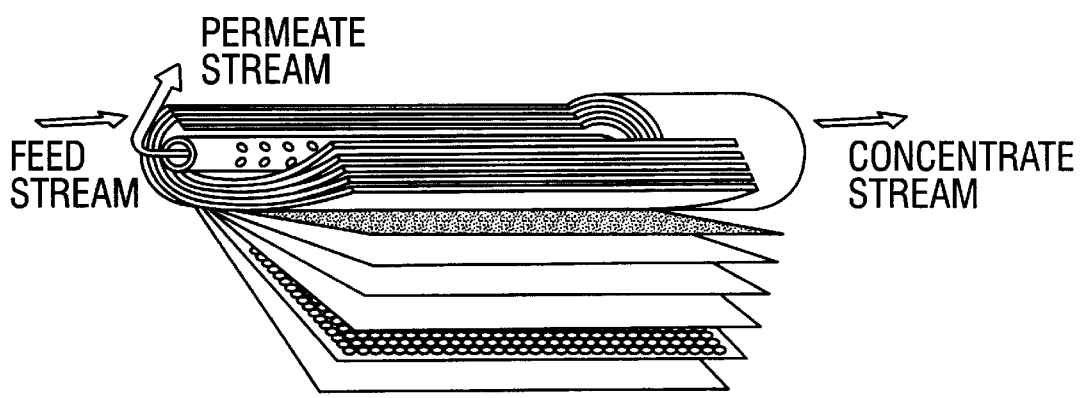
FIG. 3 is a schematic drawing of a reverse osmosis device as employed in FIG. 1.
Figure 4:
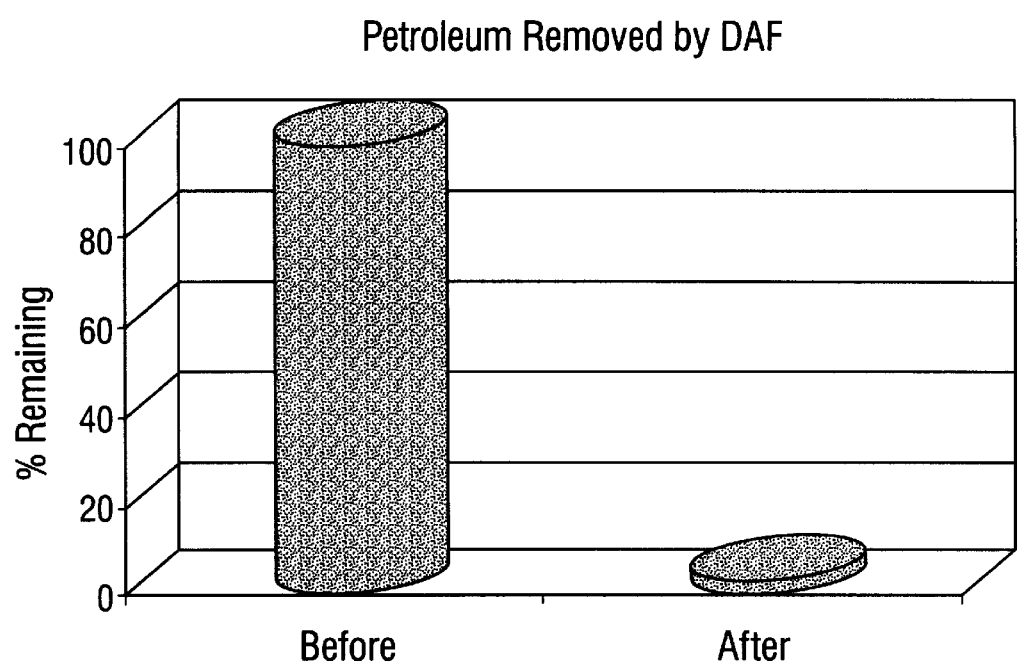
FIG. 4 is a chart showing the percentage of petroleum removed by the dissolved air floatation process.

A flow diagram for recycling engine coolant according to the invention is illustrated in FIG. 1. Used engine coolant is received and processed to recover ethylene glycol, with or without propylene glycol, and water. The recovered solution may be then used as the primary ingredient to produce a new engine coolant. The apparatus for accomplishing purification of the used engine coolant is a relatively large system which may require, for example, a dedicated processing facility having significant quantities of recyclable used engine coolant imported from waste generation locations. In one embodiment, the apparatus is arranged in a building such that local and other building codes are met, and adequate storage is provided either internally or externally. A dike is constructed around the apparatus to ensure containment of any coolant in case of a spill.

The used engine coolant is delivered to raw storage tanks which may be 2,000–20,000 gallon iron vessels, or similar, for example, stainless steel, plastic, or fiberglass, plumbed together with isolation valves between the tanks. The tanks have inlet conduits and outlet conduits that provide fluid communication with the processing components and delivering vehicles. The recycling process is a continuous non-distillation separation process wherein the ethylene glycol, with or without propylene glycol, and water are continuously separated from the raw used coolant solution.

The flow path through the apparatus is defined by several conduits. The outlet conduit from the raw storage tanks carries used coolant to one or more filtration units for the initial filtration stage. Coolant passes through the filtration unit(s) and emerges as initial filtrate solution. In a preferred embodiment, three filtration units are positioned in series along the flow path. The filtration units may contain, for example, 100 micron, 50 micron and 10 micron industrial water filters. The filter porosity may be varied based on the character of the input used engine coolant. Filter pressure monitor gauges are interposed in the flow path upstream and down stream from each of the filtration units to monitor the pressure drops across the filters, so that any clogging or defect in the filtration units can be easily detected, collected waste materials can be appropriately removed and the filters replaced.

During the initial filtration stage, particulate substances having a diameter in excess of 10 microns are effectively removed from the coolant and deposited on the filters. A low inlet pressure switch monitors the pressure of the initial filtrate exiting the initial filtration stage. The switch communicates with a relay which terminates the operation if the pressure of the initial filtrate solution exiting the initial filtration stage falls below a certain predetermined threshold.

The initial filtrate solution is transferred via conduit to the dissolved air floatation separator (Baryon Industries, Inc. #CLFR-05/AD-DRM). The dissolved air floatation separator removes the majority of petroleum based contaminants from the partially purified coolant. Petroleum based contaminates have been shown to drastically reduce the efficiency of membrane separation systems. To further ensure that the membranes of the membrane separation systems are not exposed to petroleum contaminants, the partially purified coolant from the dissolved air floatation separator is transferred by conduit for centrifugation in a hydrocyclone separator (Vortiol Separation Systems, Pk- Pn separator), which removes additional oil and other contaminants, producing centrifuged coolant. The dissolved air floatation separator may be eliminated and the hydrocyclone separator used alone to remove petroleum based contaminants. A filter press, such as JWI model J-press #2772, may be substituted for the hydrocyclone separator.

The centrifuged coolant is collected in an intermediate storage tank and is then pressurized to 50 to 1200 psi, more particularly 100 to 800 psi, or even more particularly 350 to 600 psi by two centrifugal pumps operating in opposing directions (one clockwise, the other counter-clockwise). The pressurized coolant is passed via conduit to a semi-permeable nano filtration device (Environmental Pro, model Delta 10, 15, or 25) for additional purification. The coolant passes through the membranes of the semi-permeable nano filtration device under pressure, resulting in an ultra filtrate solution which is collected in an ultra filtrate storage tank.

The ultra filtrate solution is pressurized to 50 to 1200 psi, more particularly 50 to 800 psi, or even more particularly 50 to 300 psi and is purified by passage through a reverse osmosis device (Enviromental Pro, model Delta 10, 15, or 25), resulting in a reverse osmosis permeate. The original reverse osmosis device used was the REC-1 (Recycled Engine Coolant Corp.)

The reverse osmosis permeate, which constitutes the nearly pure recycled material, is deposited in a permeate storage tank. The permeate tank may be 500 to 5,000 gallons and is constructed of non-reactive material, for example, stainless steel. Permeate from the permeate storage tank is transported by conduit to a continuous electrolysis deionization unit (CDI) (U.S. Filter, Iron Pure CD140 or CDI H60). The solution exiting the CDI is passed to a dual bed (cation/anion) ion exchange (DI) processing device (U.S. Filter, models 2554 and 2555 in parallel, or model 2551). The CDI and DI device separate any remaining impurities from the pure recycled solution. The final, pure recycled solution obtained from the dual bed deionization unit is delivered to a chemical mixing tank composed of a non-reactive material, for example, stainless steel, plastic, or fiberglass. The chemical mixing tank thus contains the pure recycled solution which is separated by the apparatus and forms the base fluid material for a new engine coolant.

The chemical mixing tank has a large auger-type mixing device to prevent excessive introduction of air. Liquid or solid additives may be added to the pure recycled solution in the chemical mixing tank either through a conduit from an additive storage tank, or manually through an opening in the top of the tank, to produce the new engine coolant solution.

The recycled coolant is typically verified to meet ASTM coolant standards at the quality control station before delivery to the customer.

While the preferred embodiment of the foregoing invention has been set forth for purposes of illustration, the foregoing description should not be deemed a limitation of the invention herein. Accordingly, various modifications, adaptations and alternatives may occur to one skilled in the art without departing form the spirit and the scope of the present invention.

EXAMPLE 2

Removal of Emulsified Oils

Contamination by emulsified oil in used engine coolant significantly limits the use of reverse osmosis (RIO) in purifying efforts. Emulsified oils are suspensions of microscopic oil droplets in the used coolant which are created in the process of removing, storing, transferring or disposing of the used coolant. The emulsified oil is typically used engine (mineral) oil, but additives consisting of mineral oil combined with petroleum sulfonate and/or amine soaps that facilitate emulsification may also be present. This emulsified oil coats the RIO membrane, fouling it. When fouling occurs, production rates of purified coolant are drastically reduced. If ignored, the membranes could become completely coated or "blinded," requiring frequent back flushing or some other regeneration procedure. Therefore, once this fouling is suspected, the system must be shut down, a soap solution mixed, and the membrane cleaned of the emulsified oil contaminates. This is a labor-intensive and onerous procedure, thus a pre-treatment which would eliminate emulsified oil in the coolant prior to subjecting it to reverse osmosis was needed. Tests were run on various pre-treatment methods, such as chemical flocculates, clarification treatments, and dissolved air floatation (DAF).

A pre-treatment sequence was developed in which used coolant was introduced into a large feed tank with a capacity of approximately 20,000 liters. Some contaminates were gravity separated and removed as sludge. The remaining used coolant was filtered through commercial water filters rated at 50 and 10 microns, and then passed through a dissolved air floatation separator (Baryon Industries, Inc. #CLFR-05/AD-DRM), which efficiently removed petroleum contaminants. A series of laboratory bench tests were conducted with representative feed samples to determine if traces of oil remained. Test results were conclusive that there was less than 2% of the original oil concentration remaining. To purge the remaining oils and particulates, a hydrocyclone separator (Vortoil Separator Systems, Pk-Pn separator) was introduced. A filter press, such as JWI model J-press #2772, could be used in place of the hydrocyclone separator. Tests of the fluid, including analyses for oil, trace metals, and chloride, showed that no trace of oil was detectable in the R/O feed stream as it exited the hydrocyclone separator. The benefit of using the DAF/hydrocyclone separator pretreatment was to extend the cleaning interval of the reverse osmosis system from once every 2 days to weekly, monthly or longer, depending upon influx of feedstock and pretreatment. This greatly enhanced production of recycled coolant

EXAMPLE 3

Reverse Osmosis Process

In the R/O process, a feed stream of used coolant is pumped through a membrane unit. The input stream is a solution, having been treated to remove suspended matter. The pre-treated feed stream consists of the ethylene glycol with or without propylene glycol, water, and dissolved solids including molybdate, borate, nitrates, nitrites, phosphate, sulfate, metal ions, carboxylates and chloride. In addition, some dissolved low molecular weight materials pass into the membrane under applied hydrostatic pressure.

Two factors must be considered in selecting an appropriate membrane for use in the R/O process: porosity and membrane capacity. The porosity of the membrane determines the degree of purification, thus the pore structure of the membrane chosen should provide for complete removal of contaminants. The RIO process membranes of the present invention were 150–300 dalton membranes.

Membrane capacity must also be carefully considered in designing the RIO process. Membrane capacity is determined by multiplying the surface area by the "flux," defined as the volume of water permeated per unit membrane area per unit time. The standard units are GPD/ft$^2$ (m$^3$/m$^2$/day). Since capital cost and operating cost increase proportionally with membrane area, it is highly desirable to maximize membrane flux. The flux does not necessarily predict the volume of non-water permeate produced per unit area per unit time; experimentation must be performed to measure actual production for a given type of fluid other than water. Purity and flux are inversely proportional. To develop the commercial system, actual production rates were measured. These rates were then compared to flux values to develop a predictive conversion factor. The conversion factor was used to select the size of membranes required to achieve production goals. The present invention employed sixteen 4 inch diameter×40 inch length membranes. Of course, membranes of other diameters, for example 2.5 to 40 inches, and lengths may also be used in the present invention.

The viscosity of the input into the R/O system varies with the type and ratio of glycol to water in the input stream. Viscosity also increases as temperature decreases. Tests were conducted to determine the influence of several process variables on permeate rate of flow: feed circulation rate, feed pH, operating temperature, operating pressures, the degree of feed concentration and time. The data showed that productivity increased with temperature. Therefore, it is desirable to maintain a temperature as high as possible, but at which the membranes can operate without either short-term failure or long-term degradation. Depending upon local climactic conditions, a heater or heat exchanger, appropriately sized for the tank used, may be employed to maintain the temperature in a normal operating range of 75° F. to 125° F. Flux was inversely proportional to glycol concentration and to ion concentration. Other variables did not demonstrate significant influence upon flux. Samples were pulled at regular intervals and chemically analyzed at independent laboratories. These analyses were used to determine membrane rejection efficiency on the feed concentrate contaminants. Flux versus time was recorded. Overall performance of the system was evaluated in terms of system productivity, permeate quality and operating cost.

The data showed that this process recovered 96% of the ethylene glycol, propylene glycol and water in the used coolant, leaving 4% of the input volume as waste to be disposed of either by incineration or contract hauling. It may be possible to further reduce the waste volume by recovering even more of the glycol and water through local vacuum distillation of the concentrate. About 90% of the concentrated waste consisted of glycol and water.

To improve product purity while maintaining production rates, a two-stage membrane treatment strategy was implemented. Use in the RIO system of a low-flux, small porosity membrane, necessary to maximize purity, presented a severe bottleneck to system flow when used to directly process the pretreated used coolant. The decision was made to install two membrane systems in series, a "two-stage" system, based on data from experimentation with various membranes. The first stage employed semi-permeable nano filtration membranes, somewhat more porous than true reverse osmosis membranes, but along the same line of technology. The second stage employed low-flux, small porosity membranes. The use of the two-stage membrane process presented to the R/O system a nano filtered fluid that was dramatically lower in solids content. This prior processing of the coolant by semi-permeable nano filtration removed a majority of contaminants and permitted optimum productivity of permeate through the R/O membranes.

The permeate from the R/O unit was sufficiently pure to allow it to be reused in most engine coolant applications. In fact, it has been used very successfully and its performance has been reported previously (Eaton, 1997). This permeate varies in percentage of ethylene glycol depending on the percentage of ethylene glycol in the input stream. To ensure acceptability to all engine original equipment manufacturers (OEMS) a post-RIO polishing process has been developed. When this step is accomplished, an inhibitor package is added to complete the process of formulating coolant. This formulated coolant will meet ASTM and TMC RP-329 standards.

Tests conducted by the U.S. Army confirmed that the recycled coolant resulting from the method of the invention met all Army requirements. The disclosed method is one of the few processes that have been approved to recycle coolant for the U.S. Army. Detroit Diesel Corp. has also approved of the R/O process (Detroit Diesel Coolant Selections Guide, publication 7SE 298 9804).

Some newer cars and trucks use carboxylate inhibited coolant. In order to make use of this inhibitor package, it is desirable to further purify the R/O permeate, reducing chloride and borate to less than 10 ppm. Such an extremely pure coolant will permit the option of inhibition of recycled coolant with carboxylic acid type inhibitors.

Continuous electrolytic dialysis (CDI) of the reverse osmosis permeate removed ions remaining in the permeate to a total of about 100 ppm. Dual bed deionization, cost-prohibitive on less pure coolant, was now a cost-effective way to further purify the CDI- processed coolant. After CDI and dual bed deionization, the purity of the final coolant is well within ASTM standards (FIG. 5).

EXAMPLE 4

Working Example of Invention

Waste coolant is typically a dark-green to light brown, milky fluid. It contains oil, grease, glycols, glycol oxidation products, metals and metal oxides, and a mix of worn inhibitors. The objective is to recover the reusable water and glycols, with maximum efficiency, while removing all of the other contaminants and chemistry.

1. Settling

The coolant as collected at the waste generation facility is often contaminated with external environmental matter. In spite of efforts to maintain the coolant separate from other waste, it is commonly contaminated with dirt, oil, grease, nuts, fuel, bolts, and other shop artifacts. The coolant was heated and allowed to settle before being drawn from the holding tank to the processing plant.

2. Simple Filtration

The primary filtration provided separation of the gross contaminants. The chemistry of the coolant was unchanged after filtration. A bank of step-down filters strained the coolant of particulates with the final filters having approximately 20 micron ratings.

3. Dissolved Air Floatation (DAF)

The DAF system slowly floated petroleum contaminates to the top of the processing coolant, where the foamy oil layer was physically removed. The processed coolant was visibly greener and cleaner, but still contained visible traces of petroleum products. The DAF also reduced the heavy metals content of the input stream. Analysis of the collected sludge did not reveal any leachable metals.

4. Centrifugation

The coolant from the dissolved air floatation separator was centrifuged to remove the remaining petroleum contaminants. The centrifuged coolant had a cloudy green appearance.

The preliminary treatments prevented premature blinding of the membranes in the semi-permeable nano filtration and/or reverse osmosis devices.

5. Nano Filtration

To optimize production by reducing viscosity, the coolant was pre-heated to about 100° F. The semi-permeable nano filtration and reverse osmosis units were similar in appearance and function. The semi-permeable nano filtration device differed from its R/O counterpart in that it operated at a slightly lower pressure and had a set of membranes with larger porosity, giving it a more generous flux or rate of production. This system recovered about 90% of the fluid introduced; the remaining 10% was returned to the holding tank immediately preceding the semi-permeable nano filtration device containing centrifuged coolant. The nano filtrate was light yellow to pale green in color. Most of the metals, such as iron aluminum, lead and copper, were removed. The ethylene glycol concentration was compromised about 1% or 2% compared to the input stream. The concentrate that was returned to the holding tank was about 15% higher in ethylene glycol content than the input stream.

6. The High Pressure Reverse Osmosis (R/O)

Reverse osmosis addressed elimination of the difficult-to-remove contaminates that are of concern in used coolant. The particular RIO membranes used in this process were selected because they produced the following stripping efficiencies:

| | |
|---|---|
| Dissolved metals | over 99% removed |
| Formate/Glycolate | approx. 75% removed |
| Phosphate, Silicate, Molybdate | over 90% removed |
| Sulfate | over 50% removed |
| Nitrite, Nitrate, Borate | about 70% removed |
| Chloride | varies with the chemistry of the coolant, 40% to 70% removed. |

At this point, the coolant was clear, colorless, and had lost about 4% of its ethylene glycol content to the membrane selection processing. Coolant permeate of this type, with corrosion inhibitors added, has been used with great success. It is approved for use in warranted vehicles by multiple vehicle and/or engine OEMs. The fluid that did not pass through the R/O process was returned to the holding tank for the ultra filtrate solution.

7. Continuous Electrolysis Deionization (CDI)

Limitation on chloride content in recycled coolant by the State of California, in addition to other industry discussions, motivated purification of recycled coolant beyond that achieved with reverse osmosis. While RIO processed coolant can often meet virgin coolant property specifications (i.e. 25 ppm chloride), a badly contaminated used coolant will require several time-consuming and expensive passes through the process in order to purify the coolant sufficiently to meet virgin specifications.

The CDI unit has been identified as a very efficient method of removing the low-level monovalent ions such as chloride and nitrite that escape the R/O process. Boron, which is not removed by the R/O process, is not a problem for coolant destined for reinhibition with boron-buffered inhibitor packages, but conflicts with carboxylate inhibitor chemistries. The CDI removes over 90% of these ions. After passing through the CDI, coolant was crystal-clear and colorless. It contained less than 150 to 200 ppm total dissolved solids.

8. Dual-Bed Deionization (DI)

To ensure consistent low-chloride and low-boron finished products that satisfy the desires of GM and other engine OEMs, the proven dual-bed deionization process was used as the final purification step. Coolant passed over the anion and cation exchange resins exited with less than 10 ppm TDS. The DI process could be applied to the raw coolant as received by the plant with excellent technical results, but the ion beds would be exhausted at such a rapid rate as to drive the cost of recycled coolant to several times the cost of new. As a final polishing step, however, it contributed only pennies per gallon to the processing cost.

agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

Progress of a Batch of Used Coolant Through the Process Stages

|  | Settle | Filter | DAF | Spin | Nano | R/O | CDI | DI | Mix |
|---|---|---|---|---|---|---|---|---|---|
| Lead | 21 | 21 | 7 | 6 | 4 | 0 | 0 | 0 | 0 |
| Copper | 8 | 9 | 6 | 6 | 2 | 0 | 0 | 0 | 0 |
| Iron | 3 | 4 | 2 | 2 | 0 | 0 | 0 | 0 | 0 |
| Alum. | 33 | 30 | 21 | 19 | 10 | 0 | 0 | 0 | 0 |
| Phos. (P) | 1757 | 1769 | 1752 | 1650 | 925 | 39 | 4 | 0 | 0 |
| Silicon | 606 | 615 | 512 | 489 | 118 | 12 | 2 | 0 | 113 |
| Boron | 684 | 678 | 691 | 680 | 593 | 312 | 298 | 0 | 159 |
| $MbO_4$ | 381 | 399 | 391 | 378 | 129 | 19 | 2 | 0 | 0 |
| Chloride | 45 | 51 | 49 | 50 | 40 | 18 | 6 | 1 | 12 |
| Sulfate | 218 | 224 | 221 | 230 | 147 | 39 | 12 | 0 |  |
| RA | 15.2 | 15.0 | 14.5 | 14.3 | 8.1 | 4.1 | 3.0 | 1.9 | 5.7 |
| pH | 10.3 | 10.0 | 9.1 | 9.0 | 8.9 | 8.4 | 8.3 | 8.1 | 10.4 |
| FP °F. | −20 | −20 | −21 | −20 | −18 | −15 | −15 | −14 | −34 |
| FP °C. | −29 | −29 | −29 | −29 | −28 | −26 | −26 | −26 | −37 |
| Cond.* | 3620 | 3590 | 3521 | 3412 | 2742 | 2694 | 1592 | 782 | 1218 |
| $NO_2$ | 2838 | 2840 | 2812 | 2800 | 1298 | 657 | 152 | 0 | 1412 |
| $NO_3$ | 347 | 369 | 327 | 356 | 156 | 102 | 60 | 0 | 389 |
| Color | Brown | Brown | Brown | Green | Light Yellow | none | none | none | green |
| Clarity | Cloudy | Cloudy | Foggy | Foggy | clear | clear | dear | clear | clear |
| Odor | Solv. | Solv. | Solv | Solv | glycol | glycol | glycol | glycol | TT/EG |

*conductivity, in umohls, of a solution comprised of 10 ml sample and 90 ml distilled water.

EXAMPLE 5

Mobile Engine Coolant Recycling Apparatus

In this example the apparatus is a mobile, relatively compact system. A smaller system is mounted on a sled or skid and is moveable to various locations, such as commercial garages, service centers, and facilities where used engine coolant is collected. A larger version may be mounted on a truck bed. All parts of the apparatus as shown in FIG. 1 are present in the mobile system, with the exception that bulk storage of coolant to be recycled is not provided. The mobile system component parts have the same function and employ the same technology as the system described in Example 1. The parts themselves are on a smaller scale than those described in Example 1. For example, the mobile system employs one or more tanks, such as 50 gallon polyethylene drums or larger, into which the used engine coolant remotely stored can be placed, rather than 2,000–20,000 gallon iron vessels. The processing steps and flow path in the mobile system are the same as those in the stationary system described in Example 1.

All of the apparatuses and processes disclosed and claimed herein can be made and executed without undue experimentation in light of the present disclosure. While the apparatuses and processes of this invention have been described in terms of preferred embodiments, it will be apparent to those of skill in the art that variations may be applied to the apparatuses and processes and in the steps or in the sequence of steps of the processes described herein without departing from the concept, spirit and scope of the invention. More specifically, it will be apparent that certain

REFERENCES

The following references, to the extent that they provide exemplary procedural or other details supplementary to those set forth herein, are specifically incorporated herein by reference.

U.S. Pat. No. 4,946,595, issued Aug. 7, 1990.
U.S. Pat. No. 5,167,826, issued Dec. 1, 1992.
Eaton et al., "Modem Reverse Osmosis Recycling of Used Engine Coolant," SAE Technical Paper Series 971773, 1997.
Eaton, "Engine Reliability Experience of Mixed Vehicle Fleets Operating on Engine Coolant Recycled with Reverse Osmosis Technology," SAE Technical paper Series 962239, 1996.
Huff, "Using Reverse Osmosis to Recycle Engine Coolant," SAE Technical Paper Series 921635, 1992.

What is claimed is:

1. A process for purifying a glycol-based engine coolant, comprising:
   a) providing a contaminated glycol-based coolant to be purified;
   b) treating at least a portion of said coolant with a reverse osmosis process;
   c) treating at least a portion of a glycol containing permeate from said reverse osmosis process with an electrolysis deionization process;
   d) collecting at least a portion of the permeate treated by said electrolysis deionization process as purified glycol-based coolant.

2. The process for purifying engine coolant according to claim 1, wherein the purified engine coolant meets ASTM coolant standards as detailed in FIG. 5.

3. The process for purifying engine coolant according to claim 1, further comprising filtering said coolant.

4. The process for purifying engine coolant according to claim 3, further comprising filtering said coolant prior to passing said coolant through said reverse osmosis process.

5. The process for purifying engine coolant according to claim 3, further comprising filtering said coolant by at least two filters positioned in series along a flow path.

6. The process for purifying engine coolant according to claim 5 wherein the filters in series have decreasing pore size.

7. The process for purifying engine coolant according to claim 1, further comprising subjecting said coolant to dissolved air floatation prior to passing said coolant through said reverse osmosis process.

8. The process for purifying engine coolant according to claim 1, further comprising removing particulate matter from sad coolant by centrifugation.

9. The process for purifying engine coolant according to claim 8, wherein said centrifugation occurs prior to passing said coolant through said reverse osmosis process.

10. The process for purifying engine coolant according to claim 1, further comprising filtering said coolant with semi-permeable nano filtration.

11. The process for purifying engine coolant according to claim 10, wherein said semi-permeable nano filtration occurs prior to passing said coolant through said reverse osmosis process.

12. The process for purifying engine coolant according to claim 10, further comprising pressurizing said coolant to a pressure of 350 to 600 psi in performing said semi-permeable nano filtration.

13. The process for purifying engine coolant according to claim 1, further comprising pressurizing said coolant to a pressure of 50 to 300 psi prior to passing through said reverse osmosis process.

14. The process for purifying engine coolant according to claim 13, further comprising pressurizing said coolant to a pressure of 350 to 600 psi prior to passing through a semi-permeable nano filtration.

15. The process for purifying engine coolant according to claim 1, wherein the glycol-based coolant comprises ethylene glycol.

16. The process for purifying engine coolant according to claim 1, wherein the glycol-based coolant comprises propylene glycol.

17. The process for purifying a glycol-based coolant according to claim 1, further comprising the following process steps conducted prior to said reverse osmosis process:
   a) filtering said coolant;
   b) subjecting said coolant to dissolved air floatation;
   c) removing particulate matter from said coolant by centrifugation; and
   d) filtering said coolant with semipermeable nano filtration.

* * * * *